United States Patent
Schnizler et al.

[11] 3,817,115
[45] June 18, 1974

[54] TRANSMISSION FOR ELECTRIC SANDERS OR THE LIKE

[75] Inventors: Albrecht Schnizler; Herman Kieser, both of Nuertingen, Germany

[73] Assignee: Metabowerke KG, Closs, Rauch & Schnizler, Nuertingen/Wuerttemberg, Germany

[22] Filed: Nov. 22, 1972

[21] Appl. No.: 308,791

[30] Foreign Application Priority Data
Nov. 26, 1971 Germany............................ 2158598

[52] U.S. Cl. ................................................ 74/417
[51] Int. Cl............................................. F16h 1/14
[58] Field of Search................. 74/421 A, 417, 467

[56] References Cited
UNITED STATES PATENTS

| | | | |
|---|---|---|---|
| 3,182,527 | 5/1965 | Bryan | 74/467 X |
| 3,375,729 | 4/1968 | Brown et al. | 74/467 |
| 3,545,568 | 12/1970 | LaCoste | 74/467 X |
| 3,667,310 | 6/1972 | Hahner | 74/417 |

*Primary Examiner*—Leonard H. Gerin
*Attorney, Agent, or Firm*—Michael S. Striker

[57] ABSTRACT

An electrically powered portable angle sander wherein a portion of the interior of the transmission housing is filled with oil and the housing has an aerating opening which is located above the surface of oil in all angular positions of the housing. The aerating opening communicates with the interior of the housing by way of a labyrinth seal which surrounds the input shaft or the output shaft of the transmission. The aerating opening prevents the pressure of oil from rising at elevated temperatures to thus reduce the likelihood of leakage of oil between the sections of the housing and/or along that shaft which is not surrounded by the labyrinth seal.

23 Claims, 3 Drawing Figures

TRANSMISSION FOR ELECTRIC SANDERS OR THE LIKE

BACKGROUND OF THE INVENTION

The present invention relates to power tools in general, and more particularly to improvements in transmissions which can be used in electric angle sanders or similar power tools. Still more particularly, the invention relates to improvements in lubricating systems for component parts of transmissions in power tools, especially in portable electric power tools which are likely to be moved to a plurality of different positions either when in actual use or when their prime movers are at a standstill.

The housing of a transmission in a portable power tool must be provided with several cutouts, bores or analogous apertures for the passage of an input shaft (e.g., the output shaft of an electric motor which drives the transmission) and also for the passage of one or more output shafts which receive motion from the input shaft and serve to transmit motion to one or more grinding wheels, sanding disks, polishing wheels or other material removing or treating tools.

In many presently known power tools, the torque transmitting elements of the transmission are lubricated by grease. A drawback of such power tools is that grease compels the moving parts of the transmission to perform a substantial fulling work with attendant losses in output. Furthermore, grease cannot insure prolonged lubrication of moving parts of a transmission, especially in angle sanders or analogous power tools wherein the parts of the transmission rotate at a very high speed, because the rapidly rotating parts expel the grease by centrifugal force with the result that the teeth of mating gears remain without lubrication.

SUMMARY OF THE INVENTION

An object of the invention is to provide a novel and improved transmission for use in angle sanders and other types of power tools, particularly in portable electric power tools wherein the torque transmitting elements and/or other moving parts of the transmission are driven at a very high speed so that they cannot be properly lubricated by grease.

Another object of the invention is to provide a novel and improved transmission housing for use in angle sanders and analogous power tools.

A further object of the invention is to provide novel and improved means for insuring continuous lubrication of moving parts in the transmission housing of an angle sander or a like power tool, especially in an electrically powered tool.

An additional object of the invention is to construct and assemble the transmission of a power tool in such a way that the moving parts of the transmission can be lubricated with minimal losses in output and without any appreciable losses in lubricant, even if the transmission housing is moved to any one of a practically unlimited number of different angular positions.

The invention is embodied in a power tool, particularly in a portable electric angle sander or the like, which comprises a transmission housing defining a chamber for a supply of readily flowable lubricant (such as oil) which fills a portion of the chamber, and a plurality of movable parts which are mounted in the housing and at least one of which is positioned to be contacted by lubricant in the chamber, at least when the power tool is in use. The transmission housing is movable between a plurality of mutually inclined positions and has at least one aerating opening which communicates with the chamber. The opening is located at a level above the upper surface of the supply of lubricant in each position of the housing.

In accordance with a more specific feature of the invention, the power tool further comprises a contactless sealing device (preferably a labyrinth seal) which is mounted in the housing and defines a passage connecting the aerating opening with the chamber.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
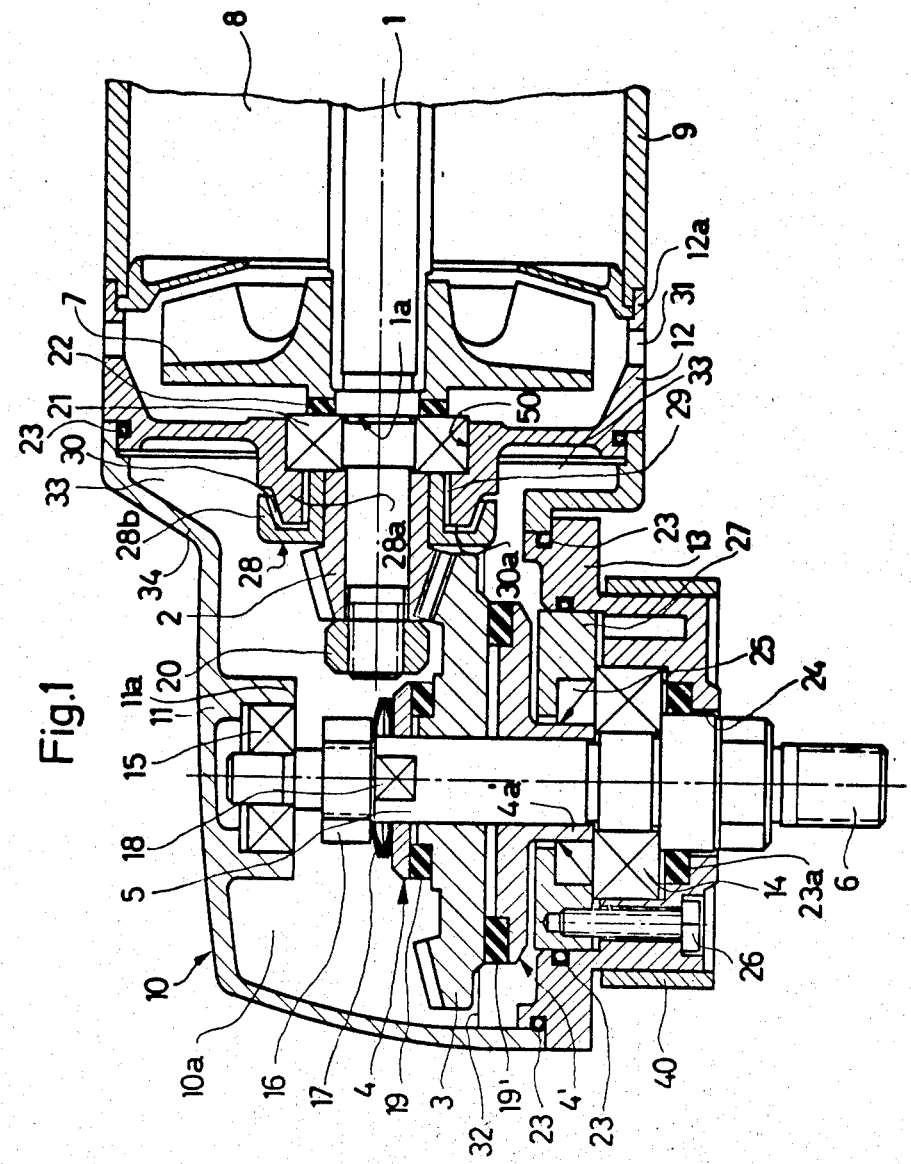
FIG. 1 is a fragmentary longitudinal sectional view of an electric power tool employing a transmission which embodies one form of the invention.

Referring first to FIG. 1, there is shown a portion of a portable electric angle sander which comprises an electric motor 8, a housing 9 for the motor 8, a transmission housing 10, and a plurality of moving1 parts in the form of torque transmitting elements mounted at least in part in the transmission housing 10. The details of the electric motor 8 form no part of the invention. This motor comprises a shaft 1 which is shown as being located in a horizontal position and constitutes the input shaft of the transmission including the torque transmitting elements in the housing 10. The transmission further includes a driver gear 2 here shown as a bevel gear which is fixed to the shaft 1 in the internal chamber 10a of the housing 10. The teeth of the driver gear 2 mesh with the teeth of a second bevel gear 3 which can drive an output shaft 5 through the intermediary of a friction clutch including two disk-shaped clutch elements 4 and 4'. One end portion of the output shaft 5 extends from the transmission housing 10 and is provided with external threads, as at 6, to facilitate connection to a material removing tool, not shown.

The interior of the motor housing 9 further accommodates a rotary fan 7 which is secured to and is driven by the shaft 1. This fan serves to cool the interior of the housing 9 when the motor 8 is on.

It will be seen that the moving parts or torque transmitting elements 1, 2, 3, 5 serve to rotate a tool on the end portion 6 of the output shaft 5 in such a way that the axis of rotation of the tool is normal to and intersects the axis of rotation of the shaft 1. Such types of transmissions are normally employed in angle sanders. In the embodiment of FIG. 1, the transmission housing 10 is assembled of several discrete sections which include a shell 11, a partition or wall 12 which is connected to the adjacent portion of the motor housing 9, and a bearing-supporting wall 13. The wall 13 is disposed between the bevel gear 3 and the rotary tool which is secured to the externally threaded exposed end portion 6 of the output shaft 5. A portion of the wall 13 is of cylindrical shape and is surrounded by a protective cap 40. This cap is secured to a disk 27 in the interior of the housing 10 by one or more screws or analogous fasteners 26. The wall 13 further receives a first anti-friction bearing 14 for the output shaft 5. A second anti-friction bearing 15 for the output shaft 5 is mounted in an internal ring-shaped projection 11a of the shell 11. The disk-shaped element 4 of the friction clutch between the bevel gear 3 and the output shaft 5 is mounted at the upper side of the bevel gear 3, as viewed in FIG. 1, and its internal surface is provided with one or more flats (not shown) cooperating with similar flats 18 on the external surface of the output shaft 5 so that the disk 4 invariably rotates with but is movable axially of the shaft 5. The other disk 4' of the friction clutch is fixed to the output shaft 5 at a level below the bevel gear 3, as viewed in FIG. 1. The disk 4 can receive torque from the bevel gear 3 by way of a ring-shaped liner 19. A second ring-shaped liner 19' is interposed between the bevel gear 3 and the disk 4'. The bias with which the disks 4 and 4' respectively bear against the liners 19 and 19' is determined by the axial position of a nut 16 which meshes with an intermediate portion of the output shaft 5 and stresses the disk 4 through the intermediary of one or more dished springs 17. By changing the axial position of the nut 16, an operator can select the maximum torque which can be transmitted from the shaft 1 of the motor 8 to the output shaft 5 of the transmission in the housing 10. A further nut 20 meshes with the left-hand end portion of the shaft 1 and urges the bevel gear 2 on the shaft 1 gainst the inner race of a thrust bearing 21 mounted in the partition 12 and surrounding an intermediate portion of the shaft 1. The inner race of the thrust bearing 21 further abuts against a shoulder 1a of the shaft 1. The inner race of the thrust bearing 21 holds the fan 7 against axial movement on the shaft 1 by way of a distancing sleeve 22. The shaft 1 is also rotatable in an antifriction bearing which is located to the right of the motor 8, as viewed in FIG. 1, and is not shown in the drawing.

The lower portion of the chamber 10a in the transmission housing 10 is filled with a supply of readily flowable lubricant, preferably oil. The level of the upper surface of the supply of lubricant in the housing 10 is shown at 32. The escape of oil from the interior of the housing 10 is prevented by a plurality of sealing devices including sealing rings 23. One such sealing ring is installed between the wall 13 and shell 11 of the transmission housing 10, and another sealing ring 23 is installed between the disk 27 and the wall 13. Still another sealing ring 23 is provided between the shell 11 and the partition 12. These sealing rings preferably consist of elastomeric material. The lower portion of the wall 13 is formed with a centrally located bore 24 through which the output shaft 5 extends with some clearance. The wall 13 further receives a sealing ring 23a which engages the peripheral surface of the output shaft 5 and is located directly below the antifriction bearing 14. A ring-shaped mechanical oil seal 25 is installed between the disk 27 and the downwardly extending hub 4a' of the friction clutch disk 4' to prevent escape of lubricant from the chamber 10a in the space between the disk 27 and the hub 4a'. The aerating opening 50 of the transmission housing 10 is provided in the partition 12 and receives the two races and the rolling elements of the thrust bearing 21. This opening 50 communicates with the atmosphere by way of the interior of the motor housing 9 or by way of ports 31 provided in a cylindrical extension 12a of the partition 12. The ports 31 also permit inflow or outflow of air which is being circulated by the fan 7 on the shaft 1 of the electric motor 8. A portion of the aerating opening 50 is obstructed by the component parts of the thrust bearing 21; however, the unobstructed portion of the opening 50 is sufficient to allow for communication of the chamber 10a with the atmosphere by way of the ports 31 so that the pressure above the uppermost level of the supply of oil in the chamber 10a cannot increase beyond atmospheric pressure even when the supply of oil is heated to an elevated temperature in response to continuing or prolonged use of the portable power tool. The aerating opening 50 can communicate with the chamber 10a by way of a composite passage which is defined by a sealing device 28 here shown as a labyrinth seal surrounding the shaft 1 of the electric motor 8 and being located in the chamber 10a adjacent to the inner side of the partition 12. The labyrinth seal 28 includes a first ring-shaped portion 28a which forms part of the partition 12 and a second ring-shaped portion 28b which surrounds and is affixed to the driver gear 2. The composite passage defined by the portions 28a and 28b of the labyrinth seal 28 includes an axially parallel annular or cylindrical portion 29, a radially extending annular portion 30a, and a substantially axially extending conical portion 30 the right-hand end of which communicates with the chamber 10a and the left-hand end of which communicates with the aerating opening 50 by way of the portions 30a and 29. It will be noted that the portion 30 of the passage defined by the labyrinth seal 28 diverges in a direction from its left-hand toward its right-hand end, i.e., the right-hand end of the passage portion 30 is more distant from the axis of the shaft 1 than its left-hand end. The labyrinth seal 28 performs the dual function of preventing leakage of oil from the chamber 10a of the transmission housing 10 and of permitting communication between the aerating opening 50 and the chamber 10a so as to prevent the pressure in the upper portion of the chamber 10a from rising above the pressure of the surrounding atmosphere.

In accordance with a feature of the invention, the aerating opening 50 and the passage defined by the labyrinth seal 28 are positioned in such a way that at least a portion of the passage is always located above the uppermost level of the supply of oil in the chamber 10a regardless of in which of several mutually inclined positions the housing 10 is held when the power tool is in actual use or when the electric motor 8 is at a standstill. In the illustrated angular position of the housing 10, the axis of the output shaft 5 is vertical, the axis of the shaft 1 is horizontal and the supply of oil is stored in the lower portion of the chamber 10a. The uppermost level 32 of the supply of oil is sufficiently high to insure that the mating teeth of bevel gears 2 and 3 are lubricated by oil which is splashed in the chamber 10a in response to rotation of the bevel gear 3, i.e., whenever the motor 8 is on. Since the passage portion 30 of the labyrinth seal 28 diverges toward the chamber 10a, any liquid which can enter this passage portion at a level below the axis of the shaft 1 will be expelled by centrifugal force in response to rotation of the shaft 1 and of the portion 28b of the labyrinth seal. Some oil is being splashed by the portion 28b when the shaft 1 rotates, and such splashing also contributes to proper lubrication of teeth on the bevel gears 2 and 3. The major part of the passage including the passage portions 30, 30a and 29 between the portions 28a and 28b of the labyrinth seal 28 remains free for the flow of air between the aerating opening 50 and the chamber 10a when the transmission housing 10 is held in the angular position shown in FIG. 1. This invariably insures that the pressure in the chamber 10a cannot rise above atmospheric pressure regardless of the temperature of supply of oil.

If the angular position of the transmission housing 10 is changed so that the housing 10 is located at a level above the motor housing 8, namely, that the axis of the shaft 1 is vertical and the output shaft 5 is located at a level above the nut 20, the supply of lubricant will be received in the chamber 10a at a level below that end of the passage portion 30 which is remotest from the axis of the shaft 1. To this end, the transmission housing 10 is provided with one or more compartments 33 which are deep enough to accommodate a sufficient quantity of oil so that the oil cannot prevent the flow of air between the aerating opening 50 and the chamber 10a by way of the passage including the passage portions 29, 30a and 30 between the portions 28a and 28b of the labyrinth seal. As shown, the compartment or compartments 33 are internal recesses of the transmission housing 10. One such recess is provided in the internal surface of the partition 12, namely, in that surface of the partition 12 which faces away from the fan 7 and motor 8 in the housing 9. As shown in the upper portion of FIG. 1, a recess or compartment 33 can be formed by an outwardly extending enlarged portion 34 or the shell 11.

If the position of the transmission housing 10 is changed by 180° so that the threaded end portion 6 of the output shaft 5 faces upwardly, the supply of lubricant is stored at a level below the annular axially parallel portion 29 of the passage which is defined by the labyrinth seal 28. This again insures that the lubricant cannot escape into the aerating opening 50 but that this opening is free to communicate with the chamber 10a above the level of lubricant therein.

An important advantage of a readily flowing lubricant, such as oil, is that the moving parts of the transmission in the housing 10 can be readily lubricated for any desired period of time with minimal losses in output. The provision of aerating opening 50 is necessary because, if the power tool of FIG. 1 is an electric angle sander, the moving parts of the transmission in the housing 10 rotate at a very high speed so that the supply of oil in the chamber 10a is heated to an elevated temperature with attendant expansion and compression of air above the level of the supply of oil (in the absence of an aerating opening). Thus, were the aerating opening 50 omitted, the pressurized oil in the chamber 10a would tend to escape through each and every clearance between the sections 11, 12 and 13 of the housing 10. Thus, by the simple expedient of providing an aerating opening which is always located above the level of the supply of oil in the chamber 10a, we insure that the pressure of oil in the chamber 10a cannot rise and that the oil remains confined in the housing 10.

It is already known to provide the housings of fixedly mounted power tools with aerating openings which are located above the level of a supply of lubricant. However, such aerating openings are provided in stationary housings which are not intended or allowed to move to a plurality of mutually inclined positions because such displacement of the housings would invariably result in spillage of oil. In the portable or movable power tool of FIG. 1, the aerating opening 50 remains above the level of the supply of oil in each and every angular position of the transmission housing 10 so that such supply remains intact for very long periods of time to insure satisfactory lubrication of all moving parts while permitting the housing 10 to be moved in any desired direction and/or at any desired angle.

The provision of the labyrinth seal 28 constitutes another advantageous feature of the power tool. This seal does not interfere with the flow of air between the chamber 10a and the aerating opening 50 but effectively prevents the flow of lubricant due to the provision of compartments 33 which are dimensioned in a way to receive a substantial part of the supply of lubricant in the corresponding angular position or positions of the transmission housing 10.

Figure 2:
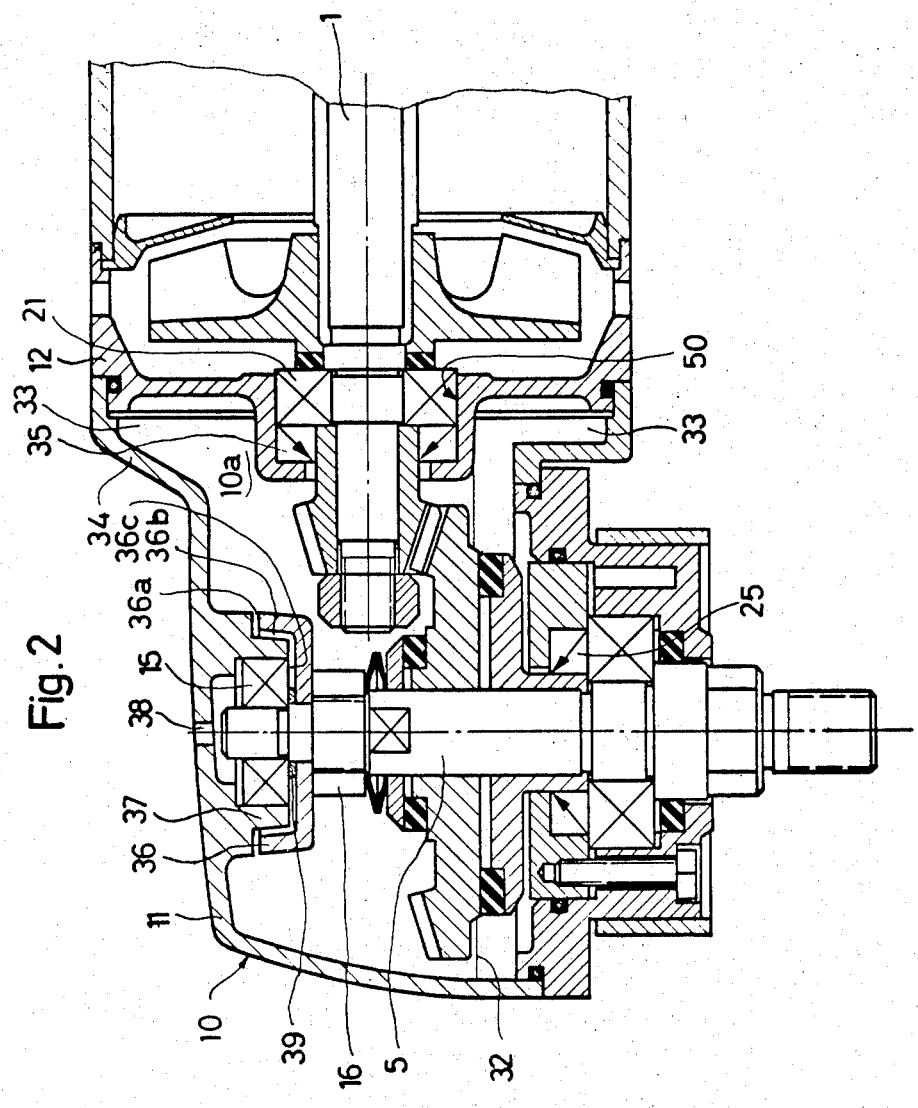
FIG. 2 is a similar sectional view but showing a modified transmission.

FIG. 2 illustrates a portion of a modified portable electric power tool wherein all such parts which are identical with or clearly analogous to the corresponding parts of the structure shown in FIG. 1 are denoted by similar reference characters. The main difference between the power tools of FIGS. 1 and 2 is that the power tool of FIG. 2 comprises a contactless sealing device which surrounds the output shaft 5 rather than the motor shaft 1. This labyrinth seal is mounted in the region of the antifriction bearing 15. It will be noted that the upper end portion of the output shaft 5 does not extend through and beyond the shell 11 of the transmission housing 10. The partition 12 receives a ring-shaped mechanical oil seal 35 which replaces the labyrinth seal 28 of FIG. 1 and prevents escape of oil from the chamber 10a into the opening 50 for the thrust bearing 21. Thus, the opening 50 of the transmission housing 10 shown in FIG. 2 does not permit the flow of air between the chamber 10a and the atmosphere.

In the power tool of FIG. 2, the contactless sealing device is a labyrinth seal which includes a cupped member 36 secured to the output shaft 5 and a bearing sleeve 37 surrounding the antifriction bearing 15 and being surrounded by the cupped member 36. The bearing sleeve 37 forms an integral part of the shell 11. The aerating opening 38 is provided in the shell 11 adjacent to the upper end face of the output shaft 5, as viewed in FIG. 2. This aerating opening is a functional equivalent of the opening 50 in FIG. 1. The cupped member 36 of the labyrinth seal is located between the nut 16 and a distancing ring 39 which abuts against the inner race of the antifriction bearing 15. The parts 36, 37 of the labyrinth seal define a passage which connects the aerating opening 38 with the chamber 10a of the transmission housing 10. This passage includes a first radial portion 36a, a conical portion 36b and a second radial portion 36c. Any oil which is caused to enter the conical portion 36b is expelled therefrom by centrifugal force in response to rotation of the cupped member 36 with the output shaft 5. The compartments 33 perform the same function as in the power tool of FIG. 1, i.e., they accommodate a certain amount of oil so that the level of the upper surface (see 32) of the supply of oil cannot reach or cannot completely seal the passage between the parts 36, 37 in any of a number of mutually inclined positions of the transmission housing 10. The quantity of oil in the chamber 10a is sufficient to insure satisfactory lubrication of all moving parts when the power tool of FIG. 2 is in actual use. If the transmission housing 10 is turned through 90° so that the axis of the shaft 1 is vertical and the output shaft 5 is located at a level above the shaft 1, the upper surface of the supply of oil might reach the lowermost part of the portion 36b and/or 36a of the passage defined by the parts 36 and 37 so that the major part of the passage still remains unobstructed and permits the flow of air between the aerating opening 38 and the chamber 10a. If the transmission housing 10 is inverted, the supply of oil accumulates in the compartment 33 defined by the portion 34 of the shell 11. If the transmission housing 10 is moved to a position in which the output shaft 5 is located at a level below the shaft 1, the supply of oil also cannot reach the aerating opening 38 so that it remains confined in the chamber 10a. The parts of the antifriction bearing 15 provide ample room for the flow of air between the aerating opening 38 and the radial portion 36a of the passage defined by the parts 36, 37 of the labyrinth seal.

Figure 3:
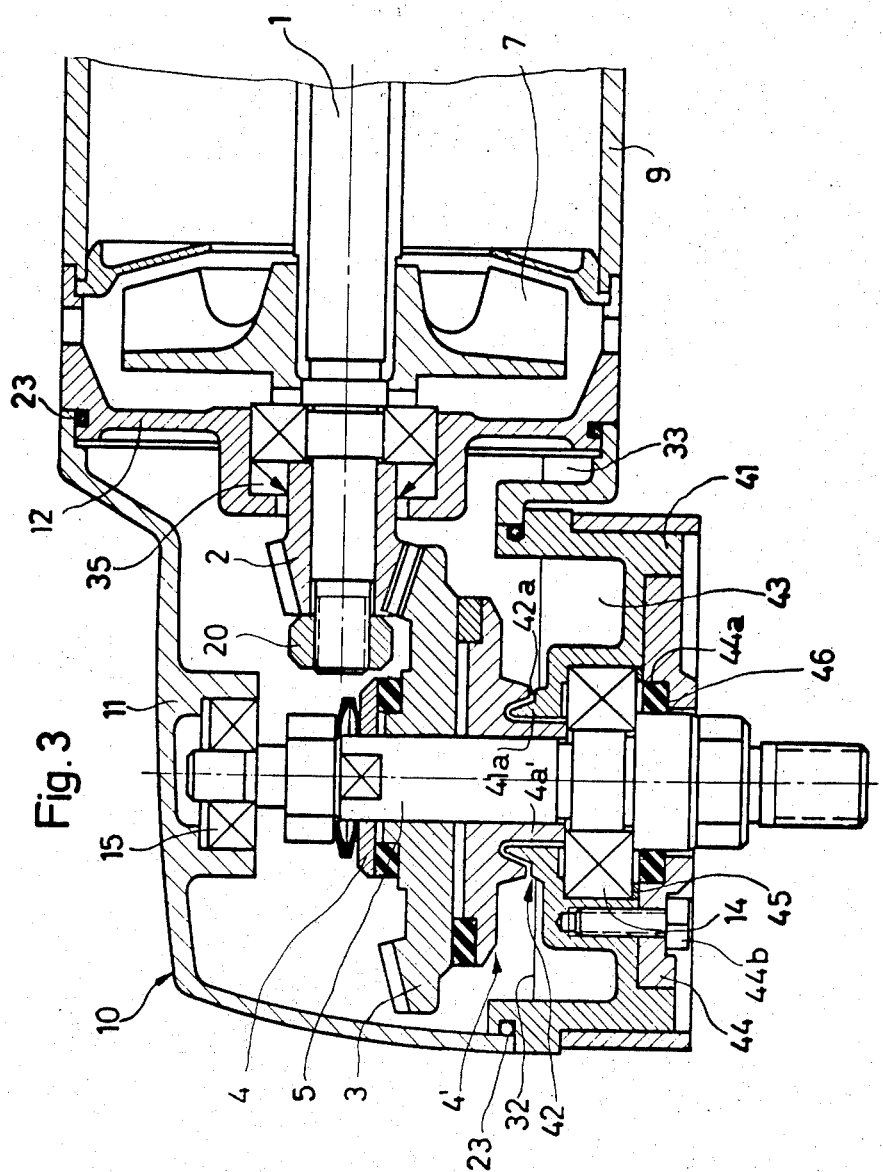
FIG. 3 is a similar sectional view but showing a third transmission.

FIG. 3 illustrates a portion of a third power tool wherein the space between the partition 12 and the shaft 1 is sealed by a mechanical oil seal 35, the same as in FIG. 2. The aerating opening 38 is omitted and a labyrinth seal 42 is provided between the transmission housing 10 and that portion of the output shaft 5 which is adjacent to the antifriction bearing 14. One annular member 41a of the labyrinth seal 42 forms part of a bearing wall 41 which replaces the wall 13 of FIG. 1. The other annular member of the seal 42 is formed by the hub 4a' of the disk 4' of the friction clutch which transmits torque from the bevel gear 3 to the output shaft 5. The wall 41 defines a compartment 43 which receives oil when the transmission housing 10 dwells in the position shown in FIG. 3. The compartment 43 is of annular shape and surrounds the antifriction bearing 14 which latter is mounted in the wall 41. The bearing 14 is held in the illustrated position by a disk-shaped lid 44 which is secured to the wall 41 by one or more screws 44b or analogous fasteners. A compensating ring 45 is inserted between the outer race of the bearing 14 and the lid 44. A porous ring 46 is mounted between the output shaft 5 and the lid 44 to intercept dust which is formed when the material removing tool secured to the shaft 5 is in actual use. However, the ring 46 allows air to flow therethrough on its way from or into the chamber 10a. Thus, the central opening 44a of the lid 44 constitutes an aerating opening which communicates with the chamber 10a by way of the composite passage defined by the labyrinth seal 42. The configuration of this passage is similar to that of the passage shown in FIG. 1. When the transmission housing 10 is held in the position of FIG. 3, the level 32 of the upper surface of the supply of oil in the chamber 10a is slightly below the radial portion 42a of the passage between the parts 41a and 4a' of the labyrinth seal 42. The main portion of the supply of oil is located in the compartments 33 and 43.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a power tool, particularly in a portable electric angle sander or the like, a combination comprising a transmission housing defining a chamber containing a supply of readily flowable lubricant which fills a portion of said chamber; and a plurality of parts including an input member and an output member movably mounted in said housing and located at least in part in said chamber to be contacted by lubricant therein, at least when the power tool is in use, said housing being movable between a plurality of mutually inclined positions and having at least one aerating opening communicating with said chamber, said aerating opening being located above the level of the upper surface of said supply of lubricant in each of said positions of said housing, said positions including at least two positions disposed at an angle of at least 90° with respect to each other.

2. A combination as defined in claim 1, wherein said housing comprises a plurality of discrete interconnected sections and elastic sealing elements interposed between said sections.

3. In a power tool, particularly in a portable electric angle sander or the like, a combination comprising a transmission housing defining a chamber containing a supply of readily flowable lubricant which fills a portion of said chamber; a plurality of parts including an input member and an output member movably mounted in said housing and located at least in part in said chamber to be contacted by lubricant therein, at least when the power tool is in use, said housing being movable between a plurality of mutually inclined positions and having at least one aerating opening communicating with said chamber, said aerating opening being located above the level of the upper surface of said supply of lubricant in each of said positions of said housing; and a contactless sealing device mounted in said housing and defining a passage connecting said chamber with said aerating opening.

4. In a power tool, particularly in a portable electric angle sander or the like, a combination comprising a transmission housing defining a chamber containing a supply of readily flowable lubricant which fills a portion of said chamber; a plurality of parts including an input shaft and an output shaft rotatably mounted in said housing and located at least in part in said chamber to be contacted by lubricant therein, at least when the power tool is in use, said housing being movable between a plurality of mutually inclined positions and having at least one aerating opening communicating with said chamber, said aerating opening being located above the level of the upper surface of said supply of lubricant in each of said positions of said housing; and a contactless sealing device mounted on one of said shafts and defining an annular passage connecting said chamber with said aerating opening.

5. A combination as defined in claim 4, wherein said chamber includes at least one compartment provided in said housing to receive at least some of said supply of lubricant in at least one of said mutually inclined positions of said housing, the capacity of said compartment being sufficient to maintain the upper surface of said supply of lubricant at a level below said aerating opening in said one position of said housing.

6. A combination as defined in claim 5, wherein said compartment is an internal recess of said housing.

7. A combination as defined in claim 6, further comprising a motor housing, said housings having portions adjacent to and connected with each other and said recess being provided in said portion of said transmission housing.

8. A combination as defined in claim 4, wherein said sealing device is a labyrinth seal.

9. A combination as defined in claim 8, wherein said passage includes at least one annular portion extending substantially axially of said one shaft.

10. A combination as defined in claim 9, wherein said one annular portion of said passage has a first end communicating with said chamber and a second end communicating with said aerating opening, said one annular portion of said passage diverging from said second toward said first end thereof as considered in the radial direction of said one shaft.

11. In a power tool, particularly in a portable electric angle sander or the like, a combination comprising a transmission housing defining a chamber containing a supply of readily flowable lubricant which fills a portion of said chamber; a plurality of parts including an input member movably mounted in said housing and located at least in part in said chamber to be contacted by lubricant therein, at least when the power tool is in use, and an output shaft rotatably mounted in said housing and located at least in part in said chamber to be contacted by lubricant therein, at least when the power tool is in use, said housing being movable between a plurality of mutually inclined positions and having at least one aerating opening communicating with said chamber, said aerating opening being located above the level of the upper surface of said supply of lubricant in each of said positions of said housing; and a contactless sealing device surrounding said output shaft and including a first annular member provided on said housing and a second annular member provided on said shaft, one of said annular members surrounding the other of said annular members and defining therewith a passage which connects said aerating opening with said chamber.

12. A combination as defined in claim 11, wherein said shaft comprises an end portion which is fully received in said housing and said aerating opening is coaxial with and adjacent to said end portion of said shaft.

13. In a power tool, particularly in a portable electric angle sander or the like, a combination comprising a transmission housing defining a chamber containing a supply of readily flowable lubricant which fills a portion of said chamber; a plurality of parts including an input shaft rotatably mounted in said housing and having a portion extending into said chamber to be contacted by lubricant therein, at least when the power tool is in use, a gear mounted on said portion of said shaft, and an output member movably mounted in said housing and located at least in part in said chamber to be contracted by lubricant therein, at least when the power tool is in use, said housing being movable between a plurality of mutually inclined positions and having at least one aerating opening communicating with said chamber, said aerating opening being located above the level of the upper surface of said supply of lubricant in each of said positions of said housing; and a contactless sealing device mounted in said housing and surrounding said shaft, said sealing device defining a passage connecting said chamber with said aerating opening and including a plurality of annular portions extending in substantial parallelism with the axis of said shaft.

14. A combination as defined in claim 13, wherein said output member is a second shaft rotatably mounted in said housing and having a portion received in said chamber, said parts further including a second gear meshing with said first mentioned gear and rotatable on said portion of said second shaft, and friction clutch means interposed between said second shaft and said second gear.

15. A combination as defined in claim 14, wherein said gears are bevel gears.

16. A combination as defined in claim 14, further comprising a mechanical seal interposed between said second shaft and said housing to prevent the escape of lubricant from said chamber along said second shaft.

17. In a power tool, particularly in a portable electric angle sander or the like, a combination comprising a transmission housing defining a chamber containing a supply of readily flowable lubricant which fills a portion of said chamber; a plurality of parts including input and output shafts rotatably mounted in said housing and having portions extending into said chamber to be contacted by lubricant therein, at least when the power tool is in use, said parts further including mating gears provided on said portions of said shafts in said chamber, said housing being movable between a plurality of mutually inclined positions and having at least one aerating opening communicating with said chamber, said aerating opening being located above the level of the upper surface of said supply of lubricant in each of said positions of said housing; mechanical seals interposed between said housing; and a labyrinth seal surrounding said portion of one of said shafts in said chamber and defining a passage connecting said chamber with said aerating opening.

18. A combination as defined in claim 17, further comprising an antifriction bearing for said one shaft, said bearing being surrounded by said labyrinth seal.

19. A combination as defined in claim 18, wherein said aerating opening is coaxial with said portion of said one shaft and communicates with said passage by way of said bearing.

20. A combination as defined in claim 17, wherein said housing comprises a plurality of interconnected discrete sections and further comprising elastic sealing elements interposed between said sections, and a plurality of antifriction bearings provided in said housing for said output shaft.

21. In a power tool, particularly in a portable electric angle sander or the like, a combination comprising a transmission housing defining a chamber containing a supply of readily flowable lubricant which fills a portion of said chamber; a plurality of parts including input and output shafts rotatably mounted in said housing and having portions extending into said chamber to be contacted by lubricant therein, at least when the power tool is in use, said parts further including a driver gear mounted on said portion of said input shaft and said housing being movable between a plurality of mutually inclined positions and having at least one aerating opening communicating with said chamber, said aerating opening being located above the level of the upper surface of said supply of lubricant in each of said positions of said housing; a mechanical seal interposed between said housing and said input shaft; and a labyrinth seal interposed between said housing and said output shaft, said labyrinth seal defining a passage connecting said chamber with said aerating opening.

22. A combination as defined in claim 21, further comprising antifriction bearing means for said portion of said output shaft, said bearing means being mounted in said housing and said housing comprising a plurality of discrete interconnected sections and elastic sealing elements interposed between said sections.

23. A combination as defined in claim 22, wherein said parts further include a second gear rotatable on said output shaft and meshing with said driver gear and a friction clutch interposed between said second gear and said output shaft, said labyrinth seal comprising a first annular portion forming part of one of said housing sections and a second annular portion forming part of said friction clutch.

* * * * *